(12) United States Patent
D'Amone et al.

(10) Patent No.: US 11,714,494 B2
(45) Date of Patent: Aug. 1, 2023

(54) RING INPUT DEVICES

(71) Applicant: Apple Inc., Cupertino, CA (US)

(72) Inventors: Gabriele D'Amone, Rome (IT); Muhammad F. Hossain, San Jose, CA (US); Ivan S. Marić, Sunnyvale, CA (US); Aidan N. Zimmerman, Sunnyvale, CA (US); Stephen E. Dey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/994,476

(22) Filed: Aug. 14, 2020

(65) Prior Publication Data

US 2021/0096657 A1 Apr. 1, 2021

Related U.S. Application Data

(60) Provisional application No. 62/906,651, filed on Sep. 26, 2019.

(51) Int. Cl.
*G06F 3/023* (2006.01)
*G06F 3/01* (2006.01)

(52) U.S. Cl.
CPC ............ *G06F 3/0233* (2013.01); *G06F 3/014* (2013.01); *G06F 3/017* (2013.01)

(58) Field of Classification Search
CPC ......... G06F 3/0233; G06F 3/014; G06F 3/017
See application file for complete search history.

(56) References Cited

U.S. PATENT DOCUMENTS

| | | | | |
|---|---|---|---|---|
| 4,833,776 A * | 5/1989 | Wakamiya | ......... | H05K 13/0421 29/714 |
| 5,175,534 A * | 12/1992 | Thatcher | ............... | G06F 3/0362 345/157 |
| 5,489,922 A | 2/1996 | Zloof | | |
| 5,832,296 A | 11/1998 | Wang et al. | | |
| 6,525,714 B1 * | 2/2003 | Varga | .................... | G06F 3/0362 345/157 |
| 8,405,618 B2 * | 3/2013 | Colgate | .................. | G06F 3/016 345/173 |
| 8,836,664 B2 * | 9/2014 | Colgate | ................. | G06F 3/0421 345/173 |

(Continued)

OTHER PUBLICATIONS

Hinchet et al., "DextrES: Wearable Haptic Feedback for Grasping in VR via a thin Form—Factor Electrostatic Brake," Oct. 2018, retrieved from https://ait.ethz.ch/projects/2018/dextres/do-wnloads/dextrES.pdf, 12 pages.

*Primary Examiner* — Albert K Wong
(74) *Attorney, Agent, or Firm* — BakerHostetler

(57) ABSTRACT

An external device, such as a head-mountable device, can be operated with a ring input device worn on a finger of a user. Such devices can be operated to provide inputs that are received and acted upon by the external device. The inputs can be provided as rotating, tilting, and/or sliding at least a portion of the ring input device with another finger of the user. The ring input device can provide feedback to the user as confirmation that the inputs are being received. A feedback system can also be operated to limit or otherwise provide a force on the finger and/or another portion of the hand to simulate sensations perceived by the user.

17 Claims, 13 Drawing Sheets

(56) References Cited

U.S. PATENT DOCUMENTS

| | | | |
|---|---|---|---|
| 9,005,084 B2* | 4/2015 | Silagy | A63B 21/023 |
| | | | 482/44 |
| 9,733,700 B2* | 8/2017 | Song | G06F 3/0488 |
| 9,983,728 B2* | 5/2018 | Dow | G06F 3/0227 |
| 10,139,906 B1* | 11/2018 | Bai | G06F 3/014 |
| 10,739,820 B2* | 8/2020 | Wang | G06F 3/011 |
| 10,860,100 B2* | 12/2020 | Osterhout | G06F 3/012 |
| 11,237,719 B2* | 2/2022 | Mistry | G04G 21/00 |
| 11,324,292 B2* | 5/2022 | Min | A44C 9/0023 |
| 2002/0084986 A1* | 7/2002 | Armstrong | G06F 3/03543 |
| | | | 345/163 |
| 2003/0142065 A1 | 7/2003 | Pahlavan | |
| 2011/0007035 A1 | 1/2011 | Shai | |
| 2016/0187974 A1 | 6/2016 | Mallinson | |

* cited by examiner

RING INPUT DEVICES

CROSS-REFERENCE TO RELATED APPLICATION

This application claims the benefit of U.S. Provisional Application No. 62/906,651, entitled "RING INPUT DEVICES," filed Sep. 26, 2019, the entirety of which is incorporated herein by reference.

TECHNICAL FIELD

The present description relates generally to input devices, and, more particularly, to ring input devices worn on fingers of users.

BACKGROUND

Various devices can be operated by a user with one or more of a variety of input devices that receive user inputs. The user inputs can be communicated to another device for execution of an action that corresponds to the user input. For example, a head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device and/or by components of an input device that is separate from the head-mountable device. For example, the user can provide tactile inputs, voice commands, and other inputs while the head-mountable device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
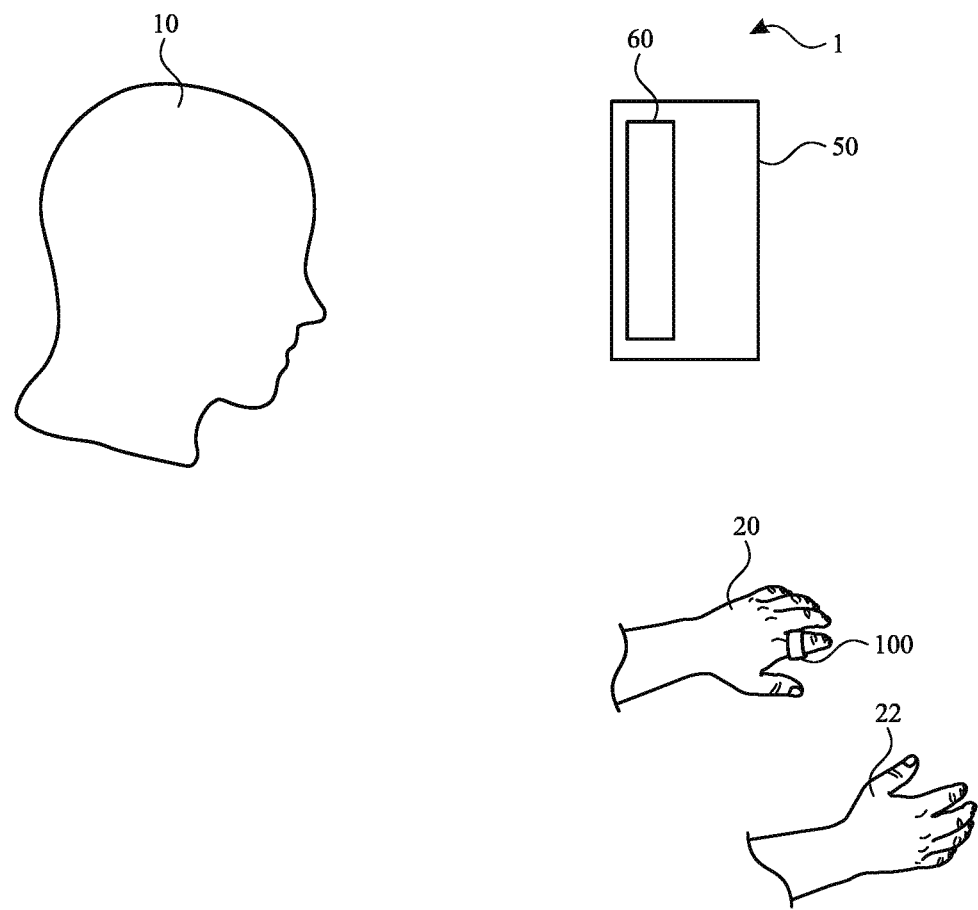
FIG. 1 illustrates a schematic view of a system including an external device and a ring input device worn on a finger of a user, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Various devices can be operated by a user with one or more of a variety of input devices that receive user inputs. The user inputs can be communicated to another device for execution of an action that corresponds to the user input. For example, head-mountable devices, such as head-mountable displays, headsets, visors, smartglasses, head-up display, etc., can perform a range of functions that are managed by the components (e.g., sensors, circuitry, and other hardware) included with the wearable device and/or a separate input device.

While some input devices are bulky or require separate tracking mechanisms, an input device can desirably provide a user with intuitive input options while remaining compact. Additionally, some types of input can be provided in VR, AR, and/or MR applications without requiring tracking of the input devices. As such, the input device can be made compact enough to be worn regularly, such that the user does not find the device to be bothersome to be worn regularly. By providing an input device that is already worn regularly by the user, the user can enter a VR, AR, and/or MR session without requiring the additional step of donning the input devices. Accordingly, a ring input device of the present disclosure can provide a compact form factor that is also able to seamlessly allow the user to perform complex interactions without compromising the overall comfort.

Some wearable devices, such as rings, can become uncomfortable when using them for extended periods. This can lead the user to adapt by employing unnatural movements, which can lead to an overall poor user experience. Accordingly, a ring input device of the present disclosure can be easily adjusted and provide user comfort while retaining the functions of the input device.

A ring input device can further act as a security key to unlock and control one or more other devices. The ring input device can include biometric or other security features that allow it to operate as an identifier of the user wearing the device. The ring input device can then communicate with other devices to allow the user to efficiently and securely interact with each of the devices.

A feedback device can further be worn by a user to provide force feedback while remaining portable and compact. Some feedback devices are bulky and require a significant amount of time for donning prior to use. In contrast, a compact feedback device can be worn in a variety of configurations for portability, efficient deployment, and effective feedback during use.

These and other embodiments are discussed below with reference to FIGS. 1-25. However, those skilled in the art will readily appreciate that the detailed description given herein with respect to these Figures is for explanatory purposes only and should not be construed as limiting.

According to some embodiments, for example as shown in FIG. 1, a system 1 can include a ring input device 100 that is worn by a user 10. For example, the ring input device 100 can be worn on a finger of a first hand 20 of the user 10 and operated by a finger of the same hand 20 and/or by a finger of another hand 22. While only one ring input device 100 is shown in FIG. 1, it will be understood that any number of ring input devices can be worn on a single or multiple fingers of the user 10 and/or on one or both hands. Where multiple ring input devices 100 are used, they can have the same or different features.

As further shown in FIG. 1, the system 1 can further include an external device 50. The ring input device 100 can be operated to receive user inputs that can be communicated to the external device 50 for operations thereof. For example, the ring input device 100 can receive a user input and communicate a signal to the external device 50. The external device 50 can perform one or more operations based on the received user input. The external device 50 can be configured to provide one or more outputs to the user 10. For example, the external device 50 can include a display 64 providing visual output to the user 10. By further example, the external device 50 can provide other types of outputs to the user, including audio output, haptic feedback, and the like. Additionally or alternatively, the external device 50 can be configured to receive inputs directly from the user and/or from another device other than the ring input device 100.

In 1 example, the external device 50 can be a head-mountable device that is worn on a head of a user. The head-mountable device can be positioned in front of the eyes of a user to provide information within a field of view of the user. The head-mountable device can provide nose pads or another feature to rest on a user's nose. The head-mountable device can be supported on a user's head with a securement element. The securement element can wrap or extend along opposing sides of a user's head. The securement element can include earpieces for wrapping around or otherwise engaging or resting on a user's ears. It will be appreciated that other configurations can be applied for securing the head-mountable device to a user's head. For example, one or more bands, straps, belts, caps, hats, or other components can be used in addition to or in place of the illustrated components of the head-mountable device. By further example, the securement element can include multiple components to engage a user's head.

The head-mountable device can include and/or support one or more cameras, as discussed further herein. The cameras can be positioned on or near an outer side of the head-mountable device to capture images of views external to the head-mountable device. The captured images can be used for display to the user or stored for any other purpose. Additionally or alternatively, other sensors, input devices, and/or output devices can be positioned at or on an exterior side of the head-mountable device.

The head-mountable device of a system 1 can be used in conjunction with the ring input device 100. The head-mountable device can operate the camera in a manner that captures one or more views of the ring input device 100 and/or the hands 20 and 22 within a field of view of the camera. The captured images can be produced on the display 60 of the head-mountable device for observation by the user 10. As used herein, a camera is a device that can optically capture a view of an environment (e.g., within and/or outside the visible spectrum of light).

The display 60 can optionally transmit light from a physical environment for viewing by the user. Such a display 60 can include optical properties, such lenses for vision correction based on incoming light from the physical environment. Additionally or alternatively, the display 60 can provide information as a display within a field of view of the user. Such information can be provided to the exclusion of a view of a physical environment or in addition to (e.g., overlaid with) a physical environment. Additionally or alternatively, other sensors, input devices, and/or output devices can be positioned at or on an interior side of the head-mountable device.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
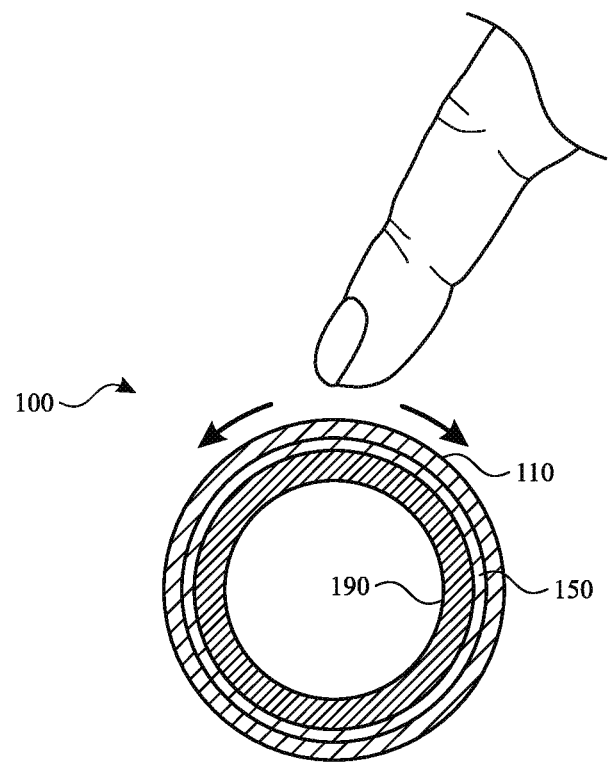
FIG. 2 illustrates a side view of a ring input device and a front view of an external device, according to some embodiments of the present disclosure.
Figure 2:
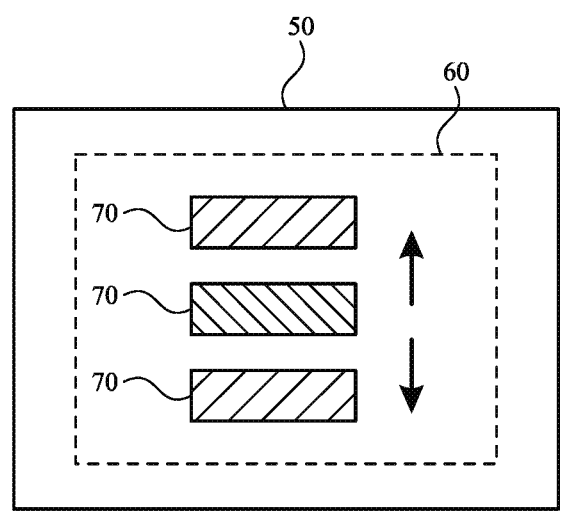

Referring now to FIG. 2, a ring input device and an external device can be used in concert to receive and respond to user inputs.

As shown in FIG. 2, a ring input device 100 can include an outer ring 110 and an inner ring 150. Each of the outer ring 110 and the inner ring 150 can form part or an entire annular shape that is formed about an axis that extends through the ring input device 100 (e.g., through a space for receiving a finger). While the outer ring 110 and the inner ring 150 are illustrated as being circumferentially continuous, it will be understood that either or both can include interruptions and/or gaps along the circumference thereof.

The outer ring 110 can form a radially outermost extent of the ring input device 100 or otherwise be at least partially exposed to provide access for operation by a user. For example, a finger of a hand 22 can apply a torque to the outer ring 110 to cause it to rotate in one of two opposite directions relative to the inner ring 150. The outer ring 110 may be knurled or otherwise textured to improve grip with the user's finger and/or thumb.

In some embodiments, the ring input device 100 may be used to accept rotary input from the user, which may be used to control aspects of the external device 50. The ring input device 100 and the external device 50 can be separate devices that communicate with each other. The ring input device 100 can receive a user input and communicate with the external device 50, and the external device 50 can perform a corresponding action. The action performed can be based, at least in part, on an existing output of the external device 50 that is provided at the time the user input is received.

For example, the outer ring 110 may be rotated by the user to scroll through items 70 shown to a user on the display 60 or select from a range of values. As such, rotation can be performed to effect a corresponding action performed by the external device 50, such as scrolling through a list or other set of items visually displayed by the external device 50. In some embodiments, the outer ring 110 may be rotated to move a cursor or other type of selection mechanism from a first displayed location to a second displayed location in order to select an icon or move the selection mechanism between various items 70 that are output on the display 60.

Additionally or alternatively, the ring input device 100 may be used to control the volume of a speaker, the brightness of the display 60, a visual output of the external device 50, optical settings of the external device 50, or other hardware settings. In these and other examples, the direction, speed, and/or acceleration of rotation can be interpreted as part of a user input, with corresponding actions being based on one or more of the detected characteristics of the user input. For example, the different directions of rotation can have the opposite, otherwise different, similar, or the same actions performed in response.

Referring again to FIG. 5, a ring input device can provide enhanced flexibility and comfort to the user during operation. For example, the ring input device 100 can include a user engagement portion 190 that forms a radially innermost extent of the ring input device 100. The user engagement portion 190 can have a shape and other features that facilitate a comfortable engagement with a finger of the user. The user engagement portion 190 can allow radially inner portions of the ring input device 100 to engage the finger such that they do not rotate about the finger when other portions of the ring input device 100 are rotated or otherwise receive a torque. For example, the user engagement portion 190 can include a flexible, elastic, and/or compliant material that conforms to the shape of the user's finger. By further example, the user engagement portion 190 can be of a polymer (e.g., silicone, fluoropolymer, etc.), a gel, a putty, and/or a foam. In contrast, the outer ring 110, the inner ring 150, and/or other portions of the ring input device 100 can be more rigid than the user engagement portion 190. For example, the outer ring 110, the inner ring 150, and/or other portions of the ring input device 100 can include metal, glass, and/or plastic. While the outer portions of the ring input device 100 (e.g., the outer ring 110) are rotated, user engagement portion 190 can provide adequate friction against the finger so that it does not rotate with the outer portions. Thus, the user engagement portion 190 can help avoid slippage during operation, thereby making the ring input device 100 easier to control and more responsive to the user's inputs.

Figure 3:
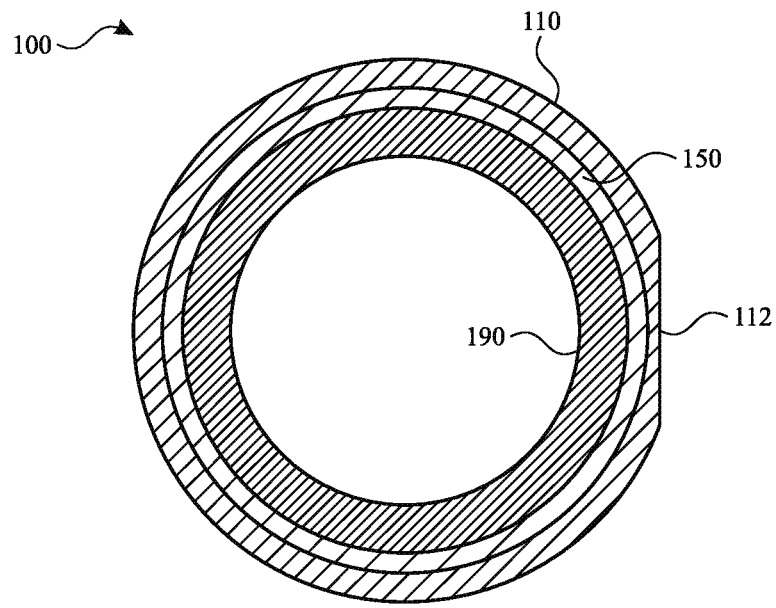
FIG. 3 illustrates a side view of a ring input device, according to some embodiments of the present disclosure.

Referring now to FIG. 3, a ring input device can optionally include one or more features for user engagement. As shown in FIG. 3, the ring input device 100 can include an outer ring 110 that includes at least one surface feature 112. For example, the surface feature 112 can be a flat portion of the outer ring 110. Other portions of the outer ring 110 can have a consistent curvature or otherwise different shape, such that the flat portion of the surface feature 112 is visually and/or tactilely distinguishable from other portions of the outer ring 110. It will be understood that other shapes are contemplated, such as convex, concave, undulating, and/or textured surface features 112. One or more functional (e.g., input and/or output) features can be provided at the surface feature 112, such as biometric (e.g., fingerprint) sensors, light indicators, cameras, and the like.

Figure 4:
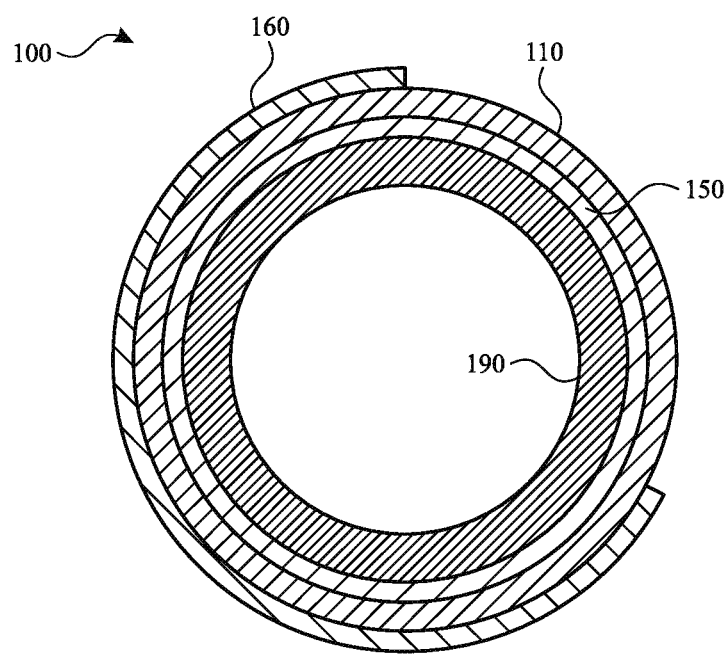
FIG. 4 illustrates a side view of a ring input device, according to some embodiments of the present disclosure.

Referring now to FIG. 4, a ring input device can optionally include one or more features at an outer periphery thereof. For example, as shown in FIG. 4, a cover 160 can be provided over and about at least a portion of the outer ring 110. The outer ring 110 can rotate within the cover 160. The outer ring 110 can be at least partially exposed through an opening of the cover 160 to provide access for operation by a user. A portion of the outer ring 110 that is within the cover 160 can rotate without being exposed to adjacent objects (e.g., fingers), which might otherwise contact and resist rotation of the outer ring 110.

Figure 5:
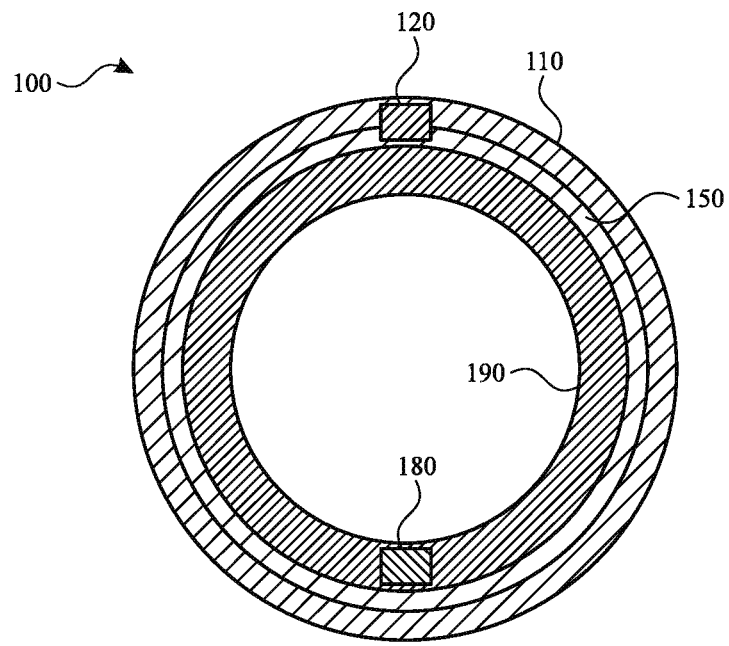
FIG. 5 illustrates a side view of a ring input device, according to some embodiments of the present disclosure.

Referring now to FIG. 5, a ring input device can receive user inputs based on torque applied by the user. Such a capability can be provided without requiring substantial rotation of an outer portion of the ring input device. For example, a ring input device can simulate a spinning ring without actually spinning. This can be accomplished by providing a smooth ring surface and sensing the scrolling action (e.g., torque) with a sensor. Haptic feedback can simulate detents to give the illusion of rotation past such detents.

The ring input device 100 can include a torque sensor 120 configured to detect torque that is applied by a user to the outer ring 110. For example, the user can apply a torque to the outer ring 110 by urging the outer ring 110 to tend to rotate about the inner ring 150. It will be understood that such a torque may not result in significant rotation about the inner ring 150. For example, the outer ring 110 can be coupled to the inner ring 150 such that no significant rotation is achieved. Despite this coupling, a torque can be applied to the outer ring 110 and transferred to an interface between the outer ring 110 and the inner ring 150. As the outer ring 110 is subjected to such a torque, a torque sensor 120 can detect the torque and interpret the torque as an input from the user.

In some embodiments, the outer ring 110 may be used to accept torque input from the user, which may be used to control aspects of the head-mountable device. The outer ring 110 may be smooth or textured to facilitate grip with the user's finger and/or thumb. It will be understood that torque can be applied to the outer ring 110 by frictionally pressing a finger against the outer ring 110 and applying a torque without moving the finger across the surface. It will also be understood that torque can be applied to the outer ring 110 by sliding the finger over a smooth surface of the outer ring 110. In either case, torque can be transmitted and detected.

In some embodiments, the outer ring 110 may be operated to provide inputs such as those described above. For example, the outer ring 110 may be torqued by the user to scroll a display or select from a range of values. In other embodiments, the outer ring 110 may be torqued to move a cursor or other type of selection mechanism from a first displayed location to a second displayed location in order to select an icon or move the selection mechanism between various icons that are output on the display. The outer ring 110 may also be used to control the volume of a speaker, the brightness of the display screen, visual output of the head-mountable device, zooming in on or out from an image, or control other settings.

The torque sensor 120 can include one or more strain gauges. The strain gauges of the torque sensor 120 can operate as a resistive sensor formed from a material that exhibits a change in electrical resistance (e.g., conductance) in response to a dimensional change such as compression, tension, or force. The strain gauges can each be a compliant material that exhibits at least one electrical property that is variable in response to deformation, deflection, or shearing of the electrode. The strain gauges may be formed from a piezoelectric, piezoresistive, resistive, or other strain-sensitive materials. While the torque sensor 120 is illustrated between the outer ring 110 and the inner ring 150, it will be understood that one or more torque sensors can be positioned between any two components, including a user engagement portion 190. By further example, a torque sensor can be incorporated into a compliant material, such as a material of the user engagement portion 190. Where an applied torque causes the compliant material to deform, the torque sensor can detect the extent and/or other characteristics of the deformation to interpret a user input.

For certain materials, resistance can change linearly with compression or tension. For other materials, resistance can change following a known curve in response to compression or tension. Accordingly, depending upon the material selected for the strain gauges and the position of the strain gauges, a particular resistance and/or measured voltage can be correlated to a particular amount of strain experienced by a particular strain gauge, which in turn can itself be correlated to an amount of force applied to the force-sensitive structure, which in turn can be correlated to an amount of torque applied to the outer ring 110.

As further shown in FIG. 5, the ring input device 100 can be provided with a feedback device 180 that includes mechanisms that facilitate haptic feedback. The feedback device 180 can be directly or indirectly coupled to the user engagement portion 190 or another portion of the ring input device 100. A feedback device can be implemented as any suitable device configured to provide force feedback, vibratory feedback, tactile sensations, and the like. For example, in one embodiment, the feedback device may be implemented as a linear actuator configured to provide a punctuated haptic feedback, such as a tap or a knock, and/or a repeating pattern of feedback. Additionally or alternatively, the feedback device 180 can include or be connected to motors, hydraulic actuators, pneumatic actuators, magnetic actuators, piezoelectric actuators, electroactive materials (e.g., polymers), stepper motors, shape-memory alloys, and/or the like for providing mechanical movement as haptic feedback.

The feedback device 180 can be operated based on the torque detected by the torque sensor 120. For example, the duration, amplitude, frequency, or other parameters of haptic feedback can be based on the magnitude, direction, duration, or other parameter of the applied torque. Such feedback can simulate rotation of the outer ring 110 along a pattern of detents, even when the outer ring 110 is not rotating.

Figure 6:
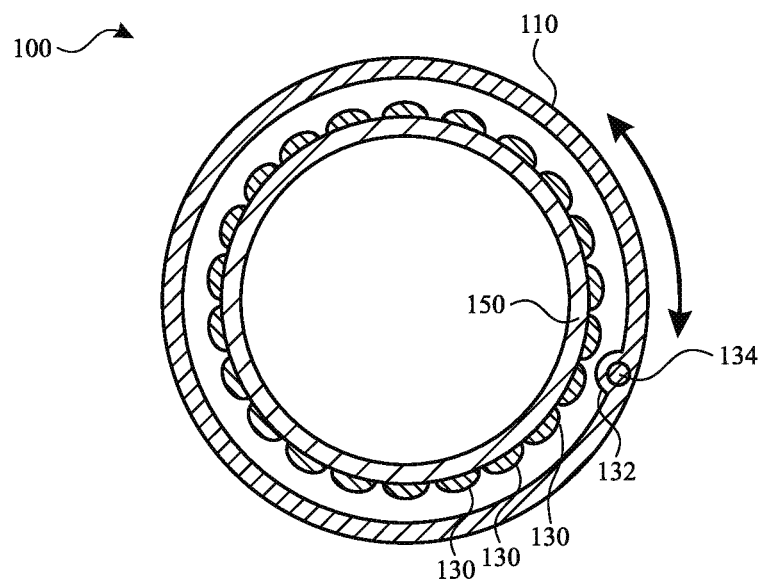
FIG. 6 illustrates a side sectional view of a ring input device, according to some embodiments of the present disclosure.

Referring now to FIG. 6, a ring input device can detect rotation and provide feedback to the user based on the rotation. As shown in FIG. 6, a ring input device 100 can include an outer ring 110 that is configured to rotate relative to an inner ring 150. While the ring input device 100 of FIG. 6 is shown without a separate user engagement portion, it will be understood that such a feature can be provided in addition to or as part of the inner ring 150. The inner ring 150 can include, support, or otherwise provide multiple inner ring protrusions 130 that extend toward the outer ring 110. The outer ring 110 can include, support, or otherwise provide one or more outer ring protrusions 132 that extend toward the inner ring 150. As the outer ring 110 rotates about the inner ring 150, the outer ring protrusion 132 can pass across one or more of the inner ring protrusions 130. The inner ring protrusions 130 and the outer ring protrusion 132 can be positioned and shaped to contact each other to provide tactile feedback to the user as the outer ring 110 rotates about the inner ring 150. For example, rather than passing smoothly over an annular surface, the outer ring protrusion 132 can bump up against the inner ring protrusions 130 during rotation. As such, the tactile feedback can be provided in a manner that is based on the type of rotation that is made by the user.

The ring input device 100 can further include a sensor 134 configured to detect rotation of the outer ring 110 about the inner ring 150. For example, a sensor 134 can be provided at or near the outer ring protrusion 132 to detect the presence of the inner ring protrusions 130. The inner ring protrusions 130 can include, support, or otherwise provide magnets in an alternating polarity arrangement. As the sensor 134 moves past the magnets of the inner ring protrusions 130, it can detect the magnetic fields thereof. For example, the sensor 134 can include a magnetometer, a hall effect sensor, a magnetic encoder, a reed switch, and/or another sensor configured to detect magnetic fields and/or changes thereof.

The magnets of the inner ring protrusions 130 can be provided in an alternating polarity arrangement to facilitate detection. For example, the magnets can be provided with different polarities relative to the outer ring 110, so that each magnet is detected by the sensor 134. By further example, the magnets can be provided in a non-repeating pattern (e.g., N-S-N-N-S-N-N-N-S), rather than a repeating pattern (e.g., N-S-N-S), so that the direction of rotation can be inferred from the sequence of magnets as they are detected by the sensor 134. Accordingly, the ring input device 100 can determine, based on the detected movement across the magnets, the direction, rate, and/or extent of rotation of the outer ring 110 about the inner ring 150.

It will be understood that the arrangement of inner ring protrusions and outer ring protrusions can be different than as illustrated in FIG. 6. For example, the outer ring 110 can include multiple protrusions providing the magnets, and the inner ring 150 can provide one or more protrusions providing the sensor. Such an arrangement maintains the ability to provide both tactile feedback and detection of magnetic fields during rotation. It will be further understood that where relative rotation of the inner and outer rings can be determined, it can further be determined what rotation is being achieved with respect to the user.

Figure 7:
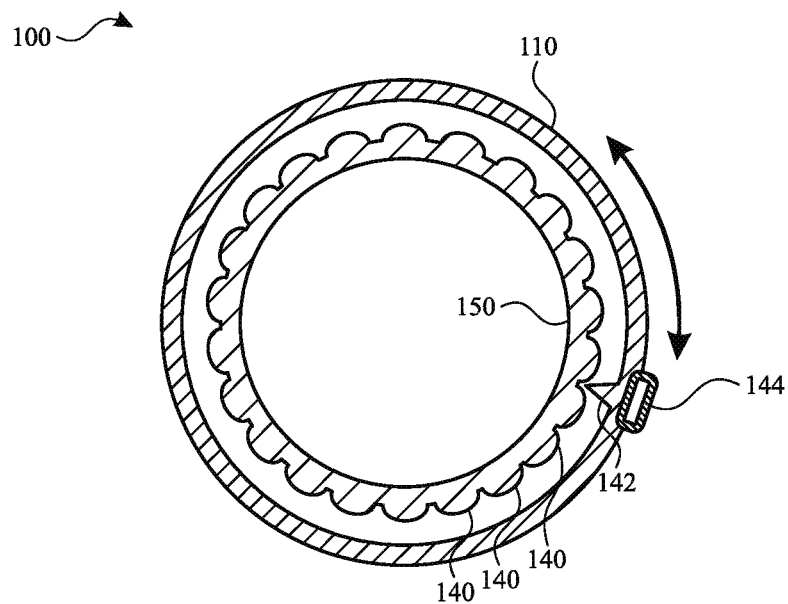
FIG. 7 illustrates a side sectional view of a ring input device, according to some embodiments of the present disclosure.

Referring now to FIG. 7, another ring input device can detect rotation and provide feedback to the user based on the rotation. As shown in FIG. 7, a ring input device 100 can include an outer ring 110 that is configured to rotate relative to an inner ring 150. While the ring input device 100 of FIG. 7 is shown without a separate user engagement portion, it will be understood that such a feature can be provided in addition to or as part of the inner ring 150. The inner ring 150 can include, support, or otherwise provide multiple inner ring protrusions 140 that extend toward the outer ring 110. The outer ring 110 can include, support, or otherwise provide one or more outer ring protrusions 142 that extend toward the inner ring 150. As the outer ring 110 rotates about the inner ring 150, the outer ring protrusion 142 can pass across one or more of the inner ring protrusions 140. The inner ring protrusions 140 and the outer ring protrusion 142 can be positioned and shaped to contact each other to provide tactile feedback to the user as the outer ring 110 rotates about the inner ring 150. For example, rather than passing smoothly over an annular surface, the outer ring protrusion 142 can bump up against the inner ring protrusions 140 during rotation. As such, the tactile feedback can be provided in a manner that is based on the type of rotation that is made by the user.

The ring input device 100 can further include a sensor 144 configured to detect contact between the outer ring protrusion 142 and the inner ring protrusions 140. For example, a sensor 144 can be provided at or near the outer ring protrusion 132 to detect contact with the inner ring protrusions 140. As the outer ring protrusion 142 contacts the inner ring protrusions 140 in a manner that deflects the outer ring 110, the sensor 144 can detect such deflection. For example, the sensor 144 can include a six-degrees of freedom inertial measurement unit ("IMU") sensor that calculates the position, velocity, and/or acceleration of the outer ring protrusion 142 based on six degrees of freedom (x, y, z, θx, θy, and θz). The sensor 144 can include one or more of an accelerometer and/or a gyroscope. Passage of the outer ring protrusion 142 across the inner ring protrusions 140 can cause detectable deflections. Accordingly, the ring input device 100 can determine, based on the detected movement, the direction, rate, and/or extent of rotation of the outer ring 110 about the inner ring 150.

It will be understood that the arrangement of inner ring protrusions and outer ring protrusions can be different than as illustrated in FIG. 7. For example, the outer ring 110 can include multiple protrusions, and the inner ring 150 can provide one or more protrusions providing the IMU sensor. Such an arrangement maintains the ability to provide both tactile feedback and detection of deflections during rotation. It will be further understood that where relative rotation of the inner and outer rings can be determined, it can further be determined what rotation is being achieved with respect to the user.

Figure 8:
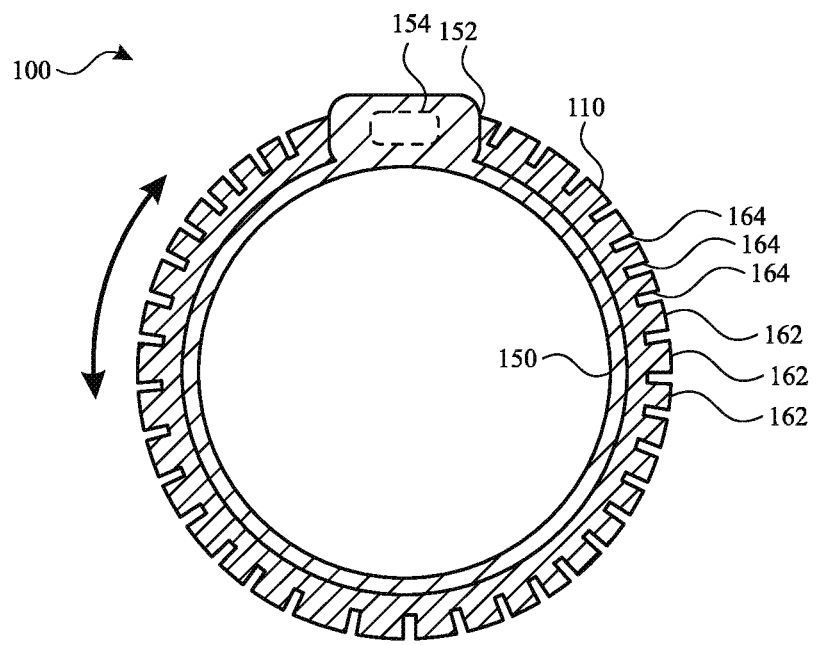
FIG. 8 illustrates a side view of a ring input device, according to some embodiments of the present disclosure.

Referring now to FIG. 8, another ring input device can detect rotation and provide feedback to the user based on the rotation. As shown in FIG. 8, a ring input device 100 can include an outer ring 110 that is configured to rotate relative to an inner ring 150. While the ring input device 100 of FIG. 8 is shown without a separate user engagement portion, it will be understood that such a feature can be provided in addition to or as part of the inner ring 150. The outer ring 110 can include, support, or otherwise provide multiple outer ring protrusions 164 that are separated from each other by gaps 162. The inner ring 150 can include, support, or otherwise provide an optical sensor 154 on a housing 152 that extends about at least a portion of the outer ring 110. As the outer ring 110 rotates about the inner ring 150, the outer ring protrusions 164 and the gaps 162 alternatingly pass through an optical pathway of the optical sensor 154. The optical sensor 154 can detect the presence of each outer ring protrusion 164 and gap 162 that passes through the optical pathway. For example, the optical sensor 154 can include a light emitter and a light sensor. The optical sensor 154 can detect the light when a gap 162 is aligned with the optical pathway in that the gap 162 transmits the light. The optical sensor 154 can detect a lack of light when an outer ring protrusion 164 is aligned with the optical pathway.

The outer ring protrusions 164 and the gaps 162 of the outer ring 110 can be provided in an alternating arrangement to facilitate detection. For example, the outer ring protrusions 164 and/or the gaps 162 can be provided with different sizes, shapes, or other features so as to be in a non-repeating pattern, rather than a repeating pattern. The differences in features can facilitate detection of the direction of rotation based on the sequence of outer ring protrusions 164 and/or the gaps 162 as they are detected by the optical sensor 154. Accordingly, the ring input device 100 can determine, based on the detected movement across the magnets, the direction, rate, and/or extent of rotation of the outer ring 110 about the inner ring 150.

It will be understood that the optical sensor 154 can operate in other ways, such as an optical encoder. In some embodiments, the optical sensor 154 can utilize an encoding pattern disposed directly on the outer ring 110. For example, the encoding pattern can include a number of light and dark markings or stripes that are axially disposed along the outer ring 110. Each stripe or combination of stripes on the outer ring 110 may be used to identify a position of the outer ring 110. For example, as light is emitted and reflected off of the outer ring 110 into the optical sensor 154, a position, rotation, rotation direction and rotation speed of the outer ring 110 may be determined. In other embodiments, the shape or form of the outer ring 110 may be used to determine a position, rotation, rotation direction and rotation speed of the outer ring 110. For example, the outer ring 110 may be fluted or have a number of channels that cause the light to be reflected in a number of different directions. Accordingly, a diffractive pattern may be used to determine the rotation, rotation direction and rotation speed of the outer ring 110.

The ring input device 100 can be provided with a feedback device 180 that includes mechanisms that facilitate haptic feedback. An example of a feedback device includes the feedback device 180 of FIG. 5. Such a feedback device can be incorporated into the ring input device 100 of FIG. 8 and operated based on the rotation detected by the optical sensor 154. For example, the duration, amplitude, frequency, or other parameters of haptic feedback can be based on the magnitude, direction, duration, or other parameter of the detected rotation. Such feedback can simulate rotation of the outer ring 110 along a pattern of detents.

It will be understood that the arrangement of the outer ring and the inner ring can be different than as illustrated in FIG. 8. For example, the inner ring 150 can include protrusions and gaps, and the outer ring 110 can provide an optical sensor for detecting movement of the protrusions and gaps of the inner ring 150 through an optical pathway of the optical sensor. Such an arrangement maintains the ability to provide both tactile feedback and detection of deflections during rotation. It will be further understood that where relative rotation of the inner and outer rings can be determined, it can further be determined what rotation is being achieved with respect to the user.

Figure 9:
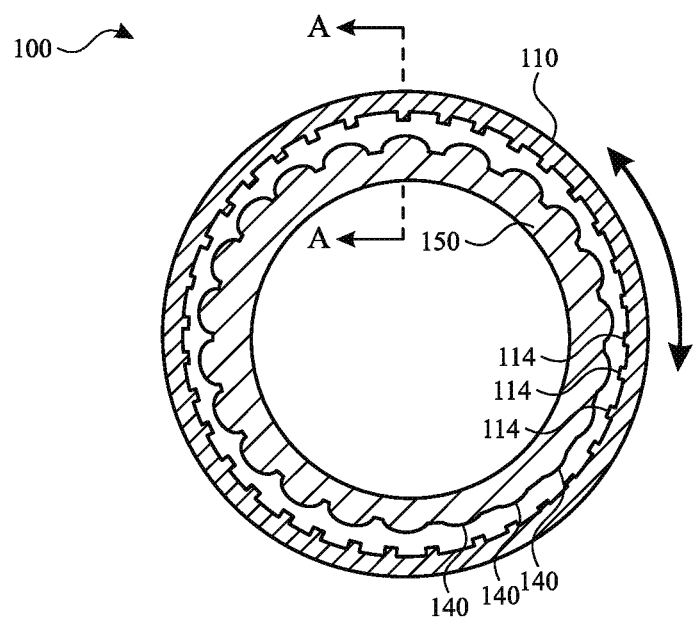
FIG. 9 illustrates a side sectional view of a ring input device, according to some embodiments of the present disclosure.
Figure 10:
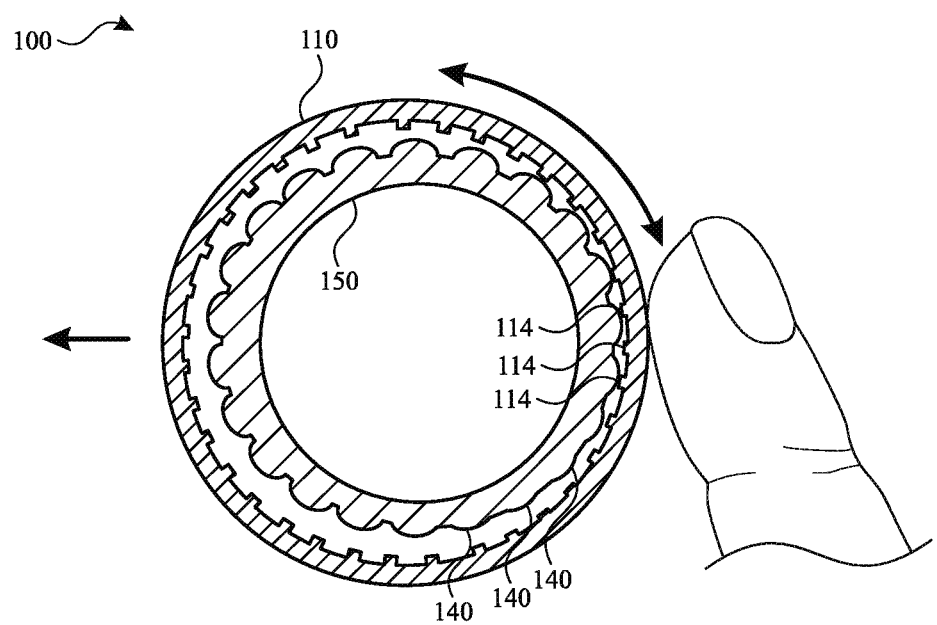
FIG. 10 illustrates a side sectional view of the ring input device of FIG. 9, according to some embodiments of the present disclosure.
Figure 11:
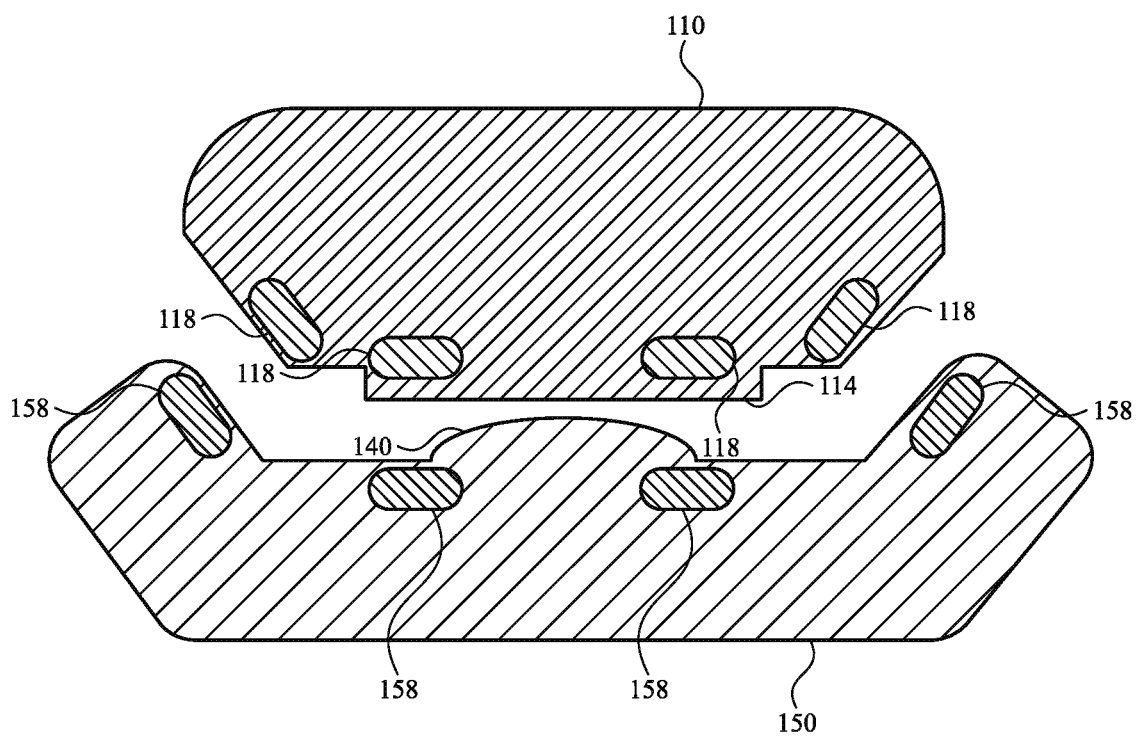
FIG. 11 illustrates a front sectional view of the ring input device of FIG. 9, according to some embodiments of the present disclosure.

Referring now to FIGS. 9-11, a ring input device can detect rotation and selectively provide feedback to the user based on the rotation and an amount of deflection applied by the user. As shown in FIGS. 9 and 10, a ring input device 100 can include an outer ring 110 that is configured to rotate relative to an inner ring 150. While the ring input device 100 of FIGS. 9 and 10 is shown without a separate user engagement portion, it will be understood that such a feature can be provided in addition to or as part of the inner ring 150. The inner ring 150 can include, support, or otherwise provide multiple inner ring protrusions 140 that extend toward the outer ring 110. The outer ring 110 can include, support, or otherwise provide one or more outer ring protrusions 114 that extend toward the inner ring 150.

In a first configuration shown in FIG. 9, the outer ring 110 has a nominal position relative to the inner ring 150. The outer ring 110 can be biased to the nominal position in the absence of an external force. In the nominal position, the outer ring 110 and the inner ring 150 can be concentric or otherwise share a common central axis (e.g., of rotation). In the nominal position, the outer ring 110 can rotate about the inner ring 150 without requiring contact between the outer ring protrusions 114 and the inner ring protrusions 140. As such, the rotation of the outer ring 110 can be smooth such that it does not provide prominent feedback to the user beyond the rotation itself.

In a second configuration shown in FIG. 10, the outer ring 110 has a deflected position relative to the inner ring 150. The outer ring 110 can be deflected by an input force from a user. In the deflected position, the axes of the outer ring 110 and the inner ring 150 can be displaced away from each other, such that they no longer share a common central axis (e.g., of rotation). While in the deflected position and as the outer ring 110 rotates about the inner ring 150, the outer ring protrusions 114 can pass across one or more of the inner ring protrusions 140. The inner ring protrusions 140 and the outer ring protrusions 114 can be positioned and shaped to contact each other to provide tactile feedback to the user as the outer ring 110 rotates about the inner ring 150. For example, rather than passing smoothly over an annular surface, the outer ring protrusions 114 can bump up against the inner ring protrusions 140 during rotation. As such, the tactile feedback can be provided in a manner that is based on the type of rotation that is made by the user.

As shown in FIG. 11, the outer ring 110 can be suspended relative to the inner ring 150 by magnets that biased the outer ring 110 to the nominal position. For example, the outer ring 110 can include outer ring magnets 118 that are positioned across inner ring magnets 158 of the inner ring 150. Each pair of opposing magnets can be arranged with polarities that repel each other. At least some of the magnet pairs can be radially aligned with each other to provide radial stability (e.g., as a radial magnetic bearing). Such an arrangement can bias the outer ring 110 to a radial position relative to the inner ring 150 that provides a consistent spacing between the outer ring 110 and the inner ring 150. Optionally, at least some of the magnet pairs can be aligned at an angle that provides axial stability (e.g., as an axial magnetic bearing). Such an arrangement can bias the outer ring 110 to an axial position relative to the inner ring 150 that provides a consistent axial alignment of the outer ring 110 and the inner ring 150. It will be recognized that other types of radial and axial bearings can be utilized.

The ring input device 100 can further include a sensor. Such a sensor can include a magnetometer, such as the sensor 134 of FIG. 6, an IMU sensor, such as the sensor 144 of FIG. 7, and/or an optical sensor, such as the sensor 144 of FIG. 8. Such a sensor can be operated to determine the direction, rate, and/or extent of rotation of the outer ring 110 about the inner ring 150. Additionally or alternatively, the ring input device 100 can include a sensor for detecting an amount or presence of deflection from the nominal position to the deflected position.

Figure 12:
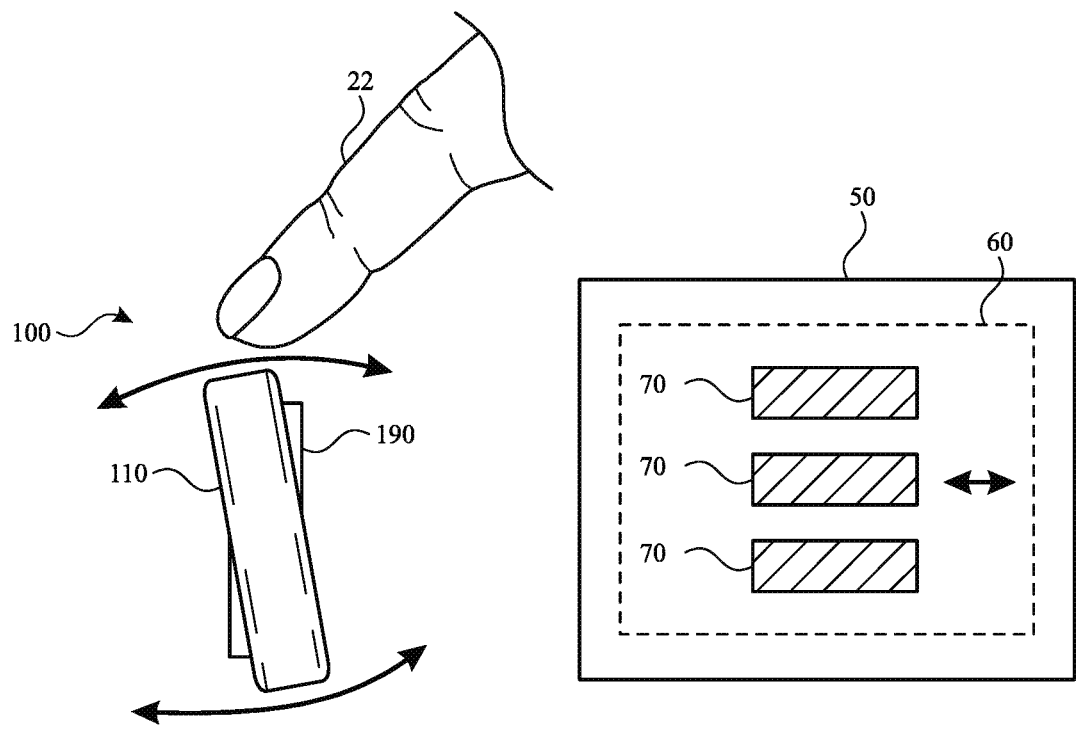
FIG. 12 illustrates a front view of a ring input device and a front view of an external device, according to some embodiments of the present disclosure.

Referring now to FIG. 12, a ring input device is shown receiving a force that results in tilting or sliding of components thereof.

For example, a ring input device 100 may be used to accept lateral input from the user, which may be used to control aspects of an external device 50. As described herein, the ring input device 100 and the external device 50 can be separate devices that communicate with each other. The ring input device 100 can receive a user input and communicate with the external device 50, and the external device 50 can perform a corresponding action. The action performed can be based, at least in part, on an existing output of the external device 50 that is provided at the time the user input is received.

For example, the outer ring 110 may be moved laterally by the user to select or otherwise modify one or more of the items 70 shown to a user on the display 60 or select from a range of values. As such, lateral movement can be performed to effect a corresponding action performed by the external device 50, such as selecting one of a list of items 70 visually displayed by the external device 50. In some embodiments, the outer ring 110 may tilt or slide to move a cursor or other type of selection mechanism from a first displayed location to a second displayed location in order to select an icon or move the selection mechanism between various items 70 that are output on the display 60. The action can be different from an action that corresponds to rotation of the outer ring 110 about the inner ring 150. In these and other examples, the direction, speed, and/or acceleration of lateral movement can be interpreted as part of a user input, with corresponding actions being based on one or more of the detected characteristics of the user input. For example, the different directions of lateral movement can have the opposite, otherwise different, similar, or the same actions performed in response.

Figure 13:
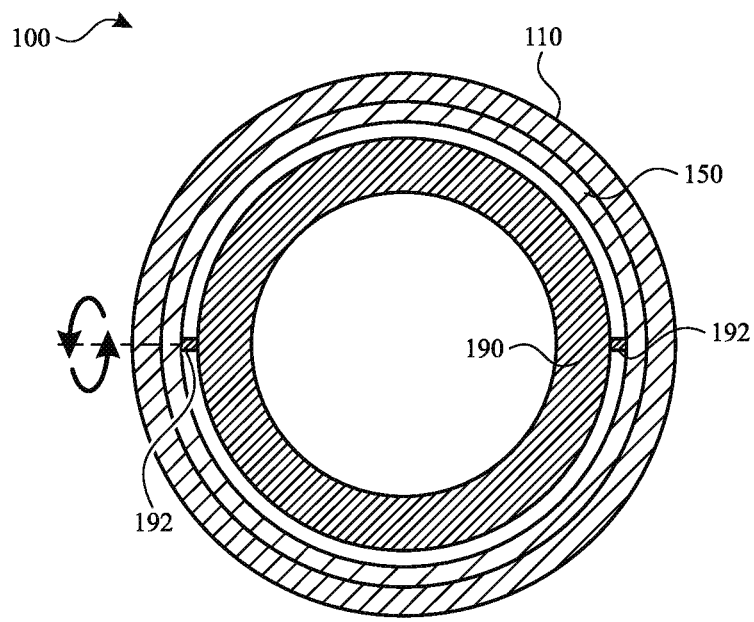
FIG. 13 illustrates a side sectional view of the ring input device of FIG. 12, according to some embodiments of the present disclosure.

Referring now to FIG. 13, a ring input device can facilitate tilting of one or more components thereof relative to other components. For example, a ring input device 100 can be provided with an outer ring 110 and an inner ring 150 for providing relative rotation there between. Such rotation can be facilitated and detected by one or more of the mechanisms described herein. By further example, the rotation of the outer ring 110 about the inner ring 150 can further be about an axis that extends through a space defined within the outer ring 110 and the inner ring 150, for example along a length of a finger on which the ring input device 100 is worn. The ring input device 100 can further include a gimbal system 192 that facilitates tilt about a different axis. For example, the gimbal system 192 can facilitate tilt of the outer ring 110 and the inner ring 150 relative to a user engagement portion 190. The tilt can be about an axis that extends through opposing ends of each of the outer ring 110, the inner ring 150, and/or the user engagement portion 190. By further example, the axis of the tilt can be transverse to the axis of the rotation of the outer ring 110 about the inner ring 150.

The ring input device 100 can further include a sensor to detect tilt. The sensor can be a sensor that detects strain along an axis of the gimbal system 192 and/or relative positions of components connected by the gimbal system 192 (e.g., the inner ring 150 and the user engagement portion 190). The sensor can output an amount, speed, and/or direction of tilt for performance of an action by the ring input device 100 and/or an external device.

Figure 14:
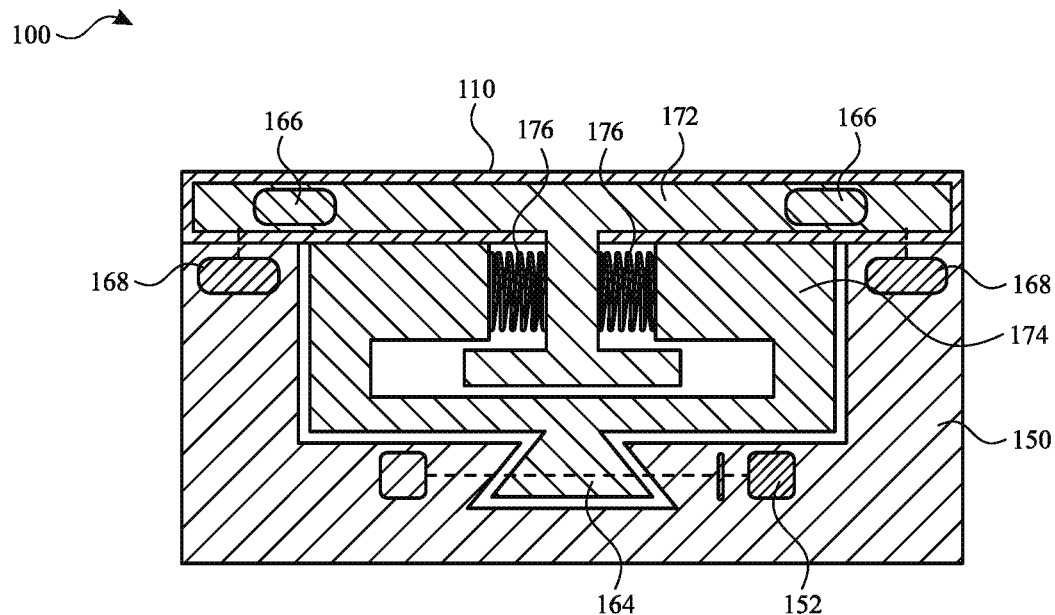
FIG. 14 illustrates a front sectional view of a ring input device, according to some embodiments of the present disclosure.
Figure 15:
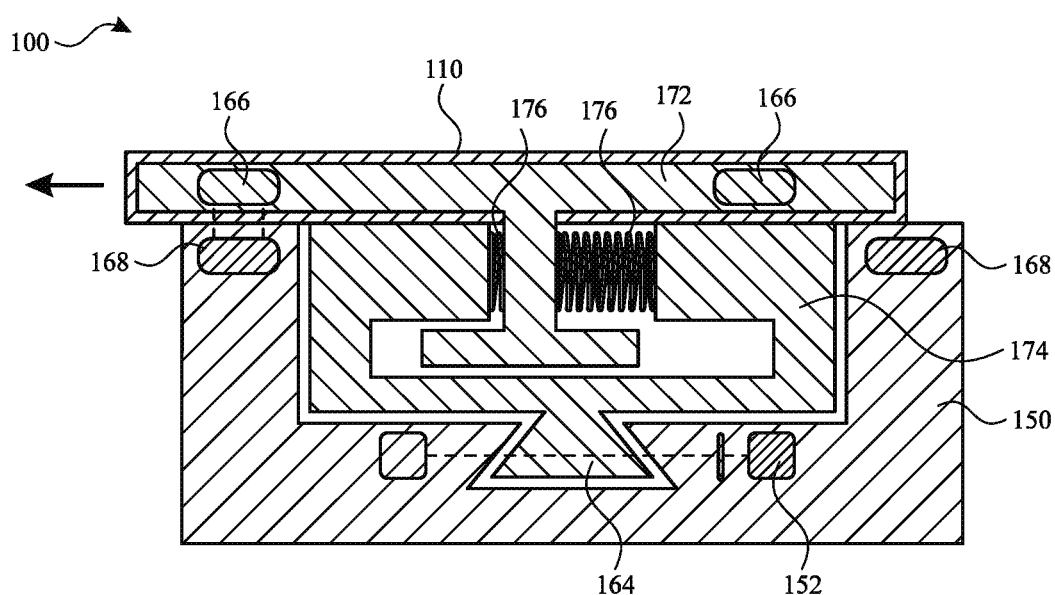
FIG. 15 illustrates a front sectional view of the ring input device of FIG. 14, according to some embodiments of the present disclosure.

Referring now to FIGS. 14 and 15, a ring input device can be provided with mechanisms to facilitate both rotary and lateral inputs by a user. As shown in FIG. 14, a ring input device 100 can include an outer ring 110 that is configured to rotate relative to an inner ring 150. While the ring input device 100 of FIGS. 14 and 15 is shown without a separate user engagement portion, it will be understood that such a feature can be provided in addition to or as part of the inner ring 150. The outer ring 110 can include, support, or otherwise provide multiple outer ring protrusions 164 that are separated from each other by gaps. The inner ring 150 can include, support, or otherwise provide an optical sensor 154 that extends about at least a portion of the outer ring 110. As the outer ring 110 rotates about the inner ring 150, the outer ring protrusions 164 and the gaps alternatingly pass through an optical pathway of the optical sensor 154. The optical sensor 154 can detect the presence of each outer ring protrusion 164 and gap 162 that passes through the optical pathway, as described herein with respect to the ring input device 100 of FIG. 8. It will be recognized that rotation and/or torque can be detect by one or more other mechanisms, including those described herein (e.g., sensors of FIGS. 5-11).

As further shown in FIGS. 14 and 15, the outer ring 110 can include a first outer ring portion 172 and a second outer ring portion 174 that are configured to move laterally relative to each other. The first outer ring portion 172 can have a bias to a nominal position and be movable to a laterally deflected position relative to the second outer ring portion 174.

In a first configuration shown in FIG. 14, the first outer ring portion 172 has a nominal position relative to the second outer ring portion 174. The first outer ring portion 172 can be bias to the nominal position in the absence of an external force. For example, one or more spring elements 176 can be provided between the first outer ring portion 172 and the second outer ring portion 174.

In a second configuration shown in FIG. 15, the first outer ring portion 172 has a deflected position relative to the second outer ring portion 174. The first outer ring portion 172 can be deflected in each of two opposing directions by an input force from a user. Alternatively, the first outer ring portion 172 can be deflected in only one direction by an input force from a user.

The ring input device 100 can be provided with one or more sensors to detect lateral movement of the first outer ring portion 172 relative to the second outer ring portion 174 and/or the inner ring 150.

For example, one or more sensors 168 can be provided at or near the inner ring 150 to detect the position of the first outer ring portion 172. The first outer ring portion 172 can include, support, or otherwise provide one or more magnets 166. As the magnets 166 moves toward or away from the sensors 168 of the inner ring 150, the sensors 168 can detect the magnetic fields thereof. For example, the sensors 168 can include a magnetometer, a hall effect sensor, a magnetic encoder, a reed switch, and/or another sensor configured to detect magnetic fields and/or changes thereof. Further example, a sensor 168 on one side can detect lateral movement toward or away from that sensor, and a sensor 168 on an opposite side can detect movement toward or away from that sensor. By further example, the sensors for detecting lateral movement can operate in other ways, such as an optical encoder, an IMU sensor, and the like.

Figure 16:
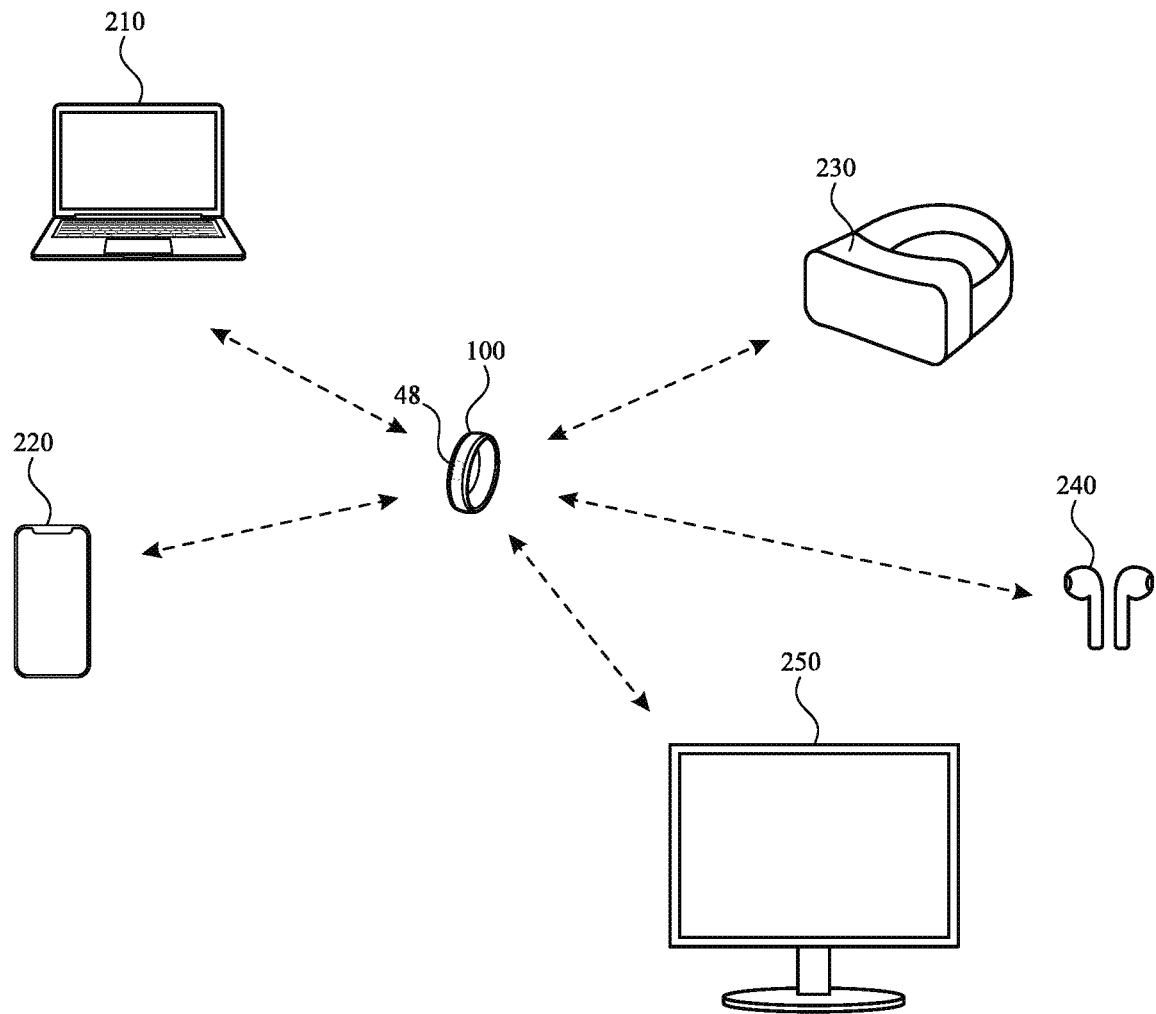
FIG. 16 illustrates a schematic view of a ring input device and various external devices, according to some embodiments of the present disclosure.

Referring now to FIG. 16, a ring input device can be used to identify a wearer to an external device. For example, as shown in FIG. 16, a ring input device 100 can communicate with any number of external devices. The external devices can correspond to the external device 50 described herein with respect to FIG. 1. By further example, examples of external devices can include a computing device 210, a smart phone 220, a head-mountable device 230, wearable audio devices 240, and/or a television 250. It will be recognized that yet other external devices are contemplated, as well as other devices operably connected to any one of those described herein.

In some embodiments, the ring input device 100 can include a sensor 48 configured to detect a characteristic of a user wearing the ring input device 100. For example, the sensor 48 can include a biometric sensor, such as a fingerprint sensor or another touch sensor. By further example, the sensor 48 can perform facial feature detection, facial movement detection, facial recognition, eye tracking, user mood detection, user emotion detection, voice detection, etc. By further example, the sensor 48 sensor can be a bio-sensor for tracking biometric characteristics, such as health and activity metrics. The sensor 48 can include a bio-sensor that is configured to measure biometrics such as heart rate, electrocardiographic (ECG) characteristics, galvanic skin resistance, and other electrical properties of the user's body.

Accordingly, the ring input device 100 can detect, verify, or otherwise be correlated with an identity of a wearer. While the ring input device 100 is worn by an identified user, the ring input device 100 can communicate with one or more external devices in a manner that causes such external devices to perform certain actions based on the identity of the wearer. For example, the ring input device 100 can detect and determine an identity of the wearer (e.g., with the sensor 48) and communicate with the external device to activate or unlock features thereof.

The ring input device 100 can automatically communicate with a given external device based on proximity thereto. For example, the ring input device 100 can communicate the identity of the wearer when brought within a particular distance to the external device. Such proximity can be determined based on a communication protocol between the ring input device 100 and the external device.

User inputs provided to the ring input device 100 can be communicated to one of multiple external devices based on a proximity thereto. For example, a user can operate the ring input device 100 by providing inputs to the ring input device 100. The ring input device 100 can then communicate with whichever one of multiple external devices to which it is closest. Accordingly, the user can operate the same ring input device 100 to provide inputs to each of multiple devices, wherein the desired target of the inputs is selected by the user moving closer to the target external device. Such determinations can be made based on different thresholds for distance. For example, the ring input device 100 can communicate with the smart phone 220 when the smart phone 220 is held within the same hand or an opposite hand as that on which the ring input device 100 is worn. By further example, the ring input device 100 can communicate with the head-mountable device 230 when the user is wearing the head-mountable device 230. By further example, the ring input device 100 can communicate with the television 250 when the user is within the same room as the television 250.

The ring input device 100 can communicate with the given external device based on user input. For example, the user can provide an input (e.g., tactile input) to the ring input device 100 to select a different target external device to which signals will be transmitted from the ring input device 100. By further example, the user can provide another input that is detectable by the ring input device 100. Such inputs can include tapping a surface (e.g., other than a surface of the ring input device 100) with a finger on which the ring input device 100 is worn. The input can then be detected by the ring input device 100 to select a particular external device and/or perform other actions. Thereafter, additional inputs by the user can be transmitted to the selected external device for performance of corresponding actions.

By further example, the user can touch an external device to select the external device as a target for user inputs received by the ring input device 100. Such inputs can include tapping a surface of the external device with a finger on which the ring input device 100 is worn. The input can then be detected by the ring input device 100 to select the particular external device and/or perform other actions. For example, the touch can be directly detected by the external device and/or inferred based on the occurrence of a touch detected by the ring input device 100 and the detection of the most nearby external device. Thereafter, additional inputs by the user can be transmitted to the selected external device for performance of corresponding actions.

Referring now to FIGS. 17-20, a feedback system can be operated to provide tactile feedback to a hand of a user, such as when operating in a VR, AR, and/or MR system. The feedback system can include components that are stowable and portable when not in use, so that the system is readily and efficiently deployed when desired.

Figure 17:
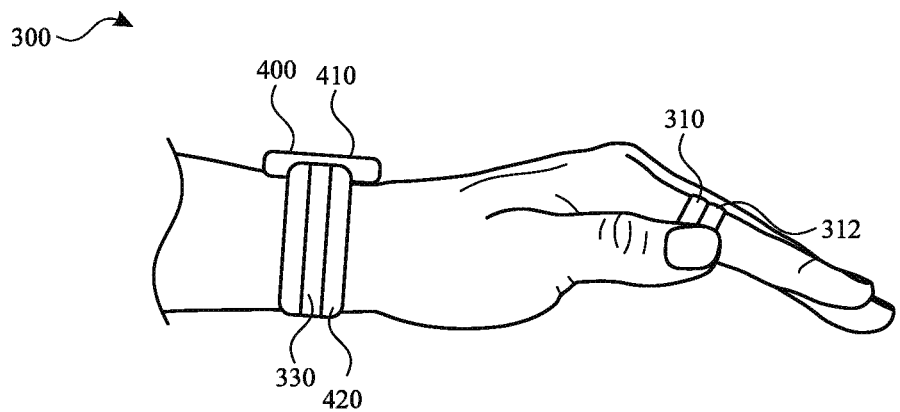
FIG. 17 illustrates a side view of a feedback system including a watch on a wrist of a user and a pair of ring elements on a finger of the user, according to some embodiments of the present disclosure.

FIG. 17 illustrates a side view of a watch 400, including the watch body 410 and a watch band 420. As shown in FIG. 17, the watch body 410 includes a housing that supports a display. The watch body 410 can be worn on a user's wrist and secured thereto by the watch band 420. The watch band 420 can be a continuous structure or assembled as separate portions (e.g., straps) that join together and provide adjustable size configurations. For example, a clasp or another mechanism (e.g., buckles, buttons, latches, locks, snaps, threads, and/or pins) can be provided to adjustably connect separate portions of the watch band 420. The watch band 420 can include attachment members (e.g., lugs) at opposing ends of the watch band 420 that fit within respective recesses or channels of the watch body 410 and allow the watch band 420 to be removably attached to the watch body 410 at one or more interfaces.

The watch body 410 can include components for interacting with a user. For example, the display may provide an image or video output for the watch body 410. The display may also provide an input surface for one or more input devices such as a touch sensing device, force sensing device, temperature sensing device, and/or a fingerprint sensor. The display may be any size suitable for inclusion at least partially within the housing of the watch body 410 and may be positioned substantially anywhere on the watch body 410. The watch body 410 can further include one or more other input/output components, for receiving input from and/or providing output to a user. For example, one or more buttons, dials, crowns, switches, or other devices can be provided for receiving input from a user. The input/output component can include a speaker, a microphone, and/or a haptic device. A haptic device can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock. The watch body 410 can further include one or more sensors.

The watch 400 can further include a tensioning element 330 extending from the watch body 410 and/or the watch band 420. Processing circuitry such as the main processor or other circuitry of the watch 400 may be communicatively coupled, via an interface, to the tensioning element 330 and/or the watch band 420. The feedback system 300 can further include a pair of ring devices 310 and 312.

In a stowed configuration, the tensioning element 330 can be maintained at or adjacent to other components of the watch 400. For example, as shown in FIG. 17, the tensioning element 330 can wrap around or adjacent to a portion of the watch band 420. In this configuration, the tensioning element 330 does not interfere with the user's operation of other components of the watch 400. As further shown in FIG. 17, each of the ring devices 310 and 312 can be worn on a finger of a user in a configuration that is compact and comfortable for the user. For example, the ring devices 310 and 312 can be worn adjacent to each other.

Figure 18:
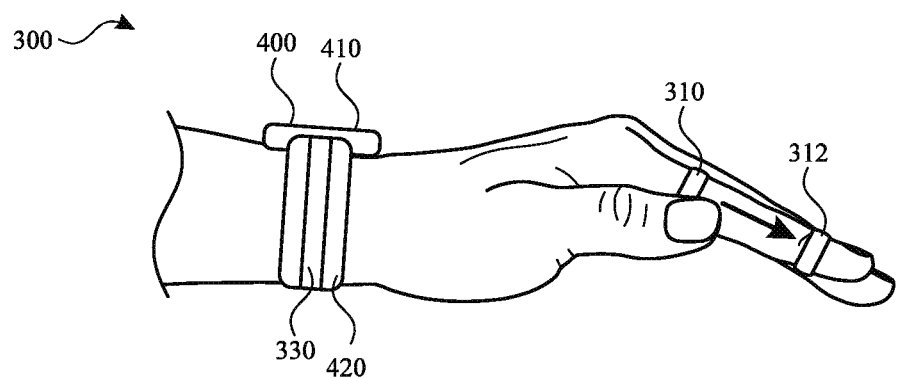
FIG. 18 illustrates a side view of the feedback system of FIG. 17 with the pair of ring elements separated from each other on the finger of the user, according to some embodiments of the present disclosure.

The ring devices and the tensioning element can be deployed and connected to each other to form a feedback device that is operable to deliver tactile feedback to a user. For example, as shown in FIG. 18, the ring devices 310 and 312 can be rearranged on a finger of the user such that they are positioned a distance apart from each other at different locations on the finger. By further example, the ring devices 310 and 312 can be separated by at least one joint along the length of the finger. When positioned at such a distance, each of the ring devices 310 and 312 can maintain a position on the finger by comfortably engaging the finger.

Figure 19:
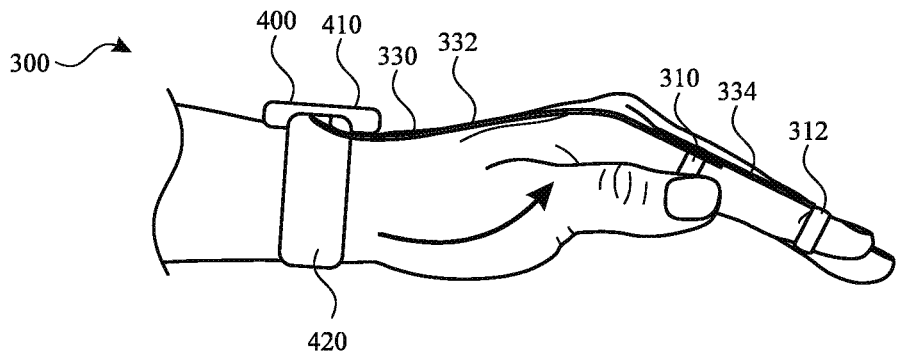
FIG. 19 illustrates a side view of the feedback system of FIGS. 17 and 18 with a tensioning element attaching the watch to the pair of ring elements, according to some embodiments of the present disclosure.

The tensioning element 330 can be deployed to attach to each of the ring devices. For example, as shown in FIG. 19, the tensioning element 330 can be moved from a position adjacent to other components of the watch 400. The tensioning element 330 can further be attached to each of the ring devices 310 and 312. The tensioning element 330 and/or each of the ring devices 310 and 312 can include one or more mechanisms to releasably lock the tensioning element 330 to the ring devices 310 and 312. Such mechanisms can include locks, latches, snaps, screws, clasps, threads, magnets, pins, an interference (e.g., friction) fit, knurl presses, bayoneting, hook and loop fasteners, and/or combinations thereof. The tensioning element 330 can optionally remain locked to the ring devices 310 and 312 until a release mechanism is actuated.

As further shown in FIG. 19, the tensioning element 330 can include multiple sliding elements 332 and 334 that are configured to slide relative to each other to increase or decrease a length of the tensioning element 330. Such a change in length can be based on an amount of overlap between the multiple sliding elements 332 and 334. The sliding elements 332 and 334 can be configured to controllably lock relative to each other to limit any change in the length of the tensioning element 330, as described further herein.

Figure 20:
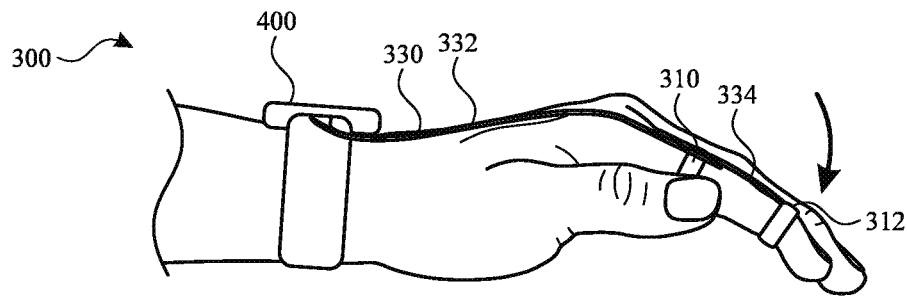
FIG. 20 illustrates a side view of the feedback system of FIGS. 17-19 with the tensioning element limiting movement of the finger, according to some embodiments of the present disclosure.

The tensioning element 330 can be operated to limit movement of a user's finger by controlling whether the sliding elements are free to slide relative to each other. For example, as shown in FIG. 20, a user wearing the feedback system 300 can flex or otherwise band a finger such that the separate ring devices 310 and 312 are moved about a joint of the user's finger. As such articulation occurs, the distance between the ring devices 310 and 312 along a pathway defined by the tensioning element 330 will tend to increase. Such articulation can be freely permitted while the sliding elements 332 and 334 are allowed to slide relative to each other. However, where the sliding elements 332 and 334 are locked relative to each other, the feedback system 300 can limit the amount of articulation that can occur about the joint of the finger. In such a condition, the user can experience a sensation of having finger articulation limited. Such a sensation can be similar to the sensation of contacting a physical object. Accordingly, the feedback system 300 can be operated to simulate contact with the physical object.

The simulation of contact with the physical object can be coordinated with and operation of a VR, AR, and/or MR system. For example, the user can be provided with a display of an environment that includes one or more objects. Such a display can be provided by, for example, a head-mountable device. Additionally, the display can output and indicator corresponding to a location of the user's hand and/or fingers relative to the displayed object. As the displayed hand and/or fingers contact, push, and/or grasp the displayed object, the tensioning element 330 of the feedback system 300 can be operated to limit movement and/or articulation of the finger to simulate such contact, as if the displayed object were a physical object in contact with the user's finger.

At the conclusion of a session, the user can return the tensioning element 330 to the watch 400 and the ring devices 310 and 312 to a stowed configuration on the finger. The user can continue to wear the watch 400 and/or the ring devices 310 and 312 while not in use and/or while in use for other purposes. As such, the corresponding components are ready for deployment when operation as a feedback system is desired.

Figure 21:
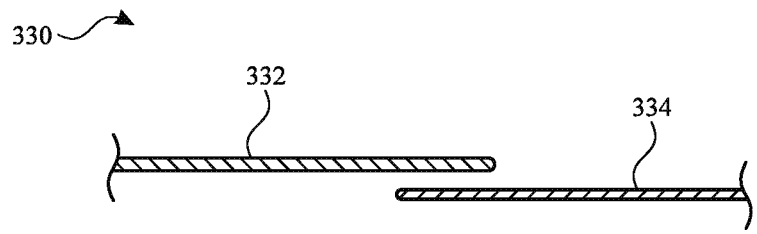
FIG. 21 illustrates a side view of a tensioning element in a released configuration, according to some embodiments of the present disclosure.
Figure 22:
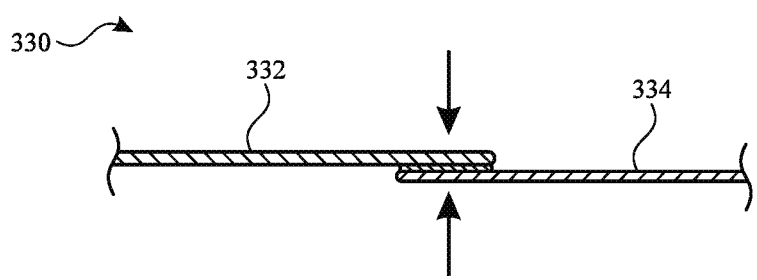
FIG. 22 illustrates a side view of the tensioning element of FIG. 21 in an engaged configuration, according to some embodiments of the present disclosure.

Referring now to FIGS. 21-24, mechanisms are illustrated to lock sliding elements relative to each other. For example, as shown in FIG. 21, multiple sliding elements 332 and 334 can be free to slide relative to each other in a first configuration. As shown in FIG. 22, the sliding elements 332 and 334 can be activated to be attracted to each other and create friction there between to resist relative sliding and/or other movement. In some embodiments, the sliding elements 332 and 334 can be or include an electrostatic brake mechanism. The multiple sliding elements 332 and 334 can include metallic strips. An electrical voltage of opposite polarities can be applied to each of the sliding elements 332 and 334. The resulting attractive force can cause the sliding elements 332 and 334 to be attracted to each other in a manner that is sufficient to create friction there between. In this condition, the sliding elements 332 and 334 can be constrained in their ability to slide relative to each other, thereby maintaining a particular length of the tensioning element 330.

Figure 23:
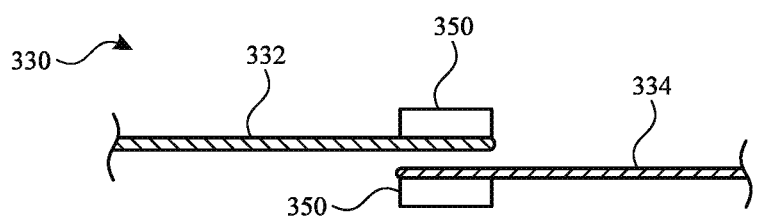
FIG. 23 illustrates a side view of a tensioning element in a released configuration, according to some embodiments of the present disclosure.
Figure 24:
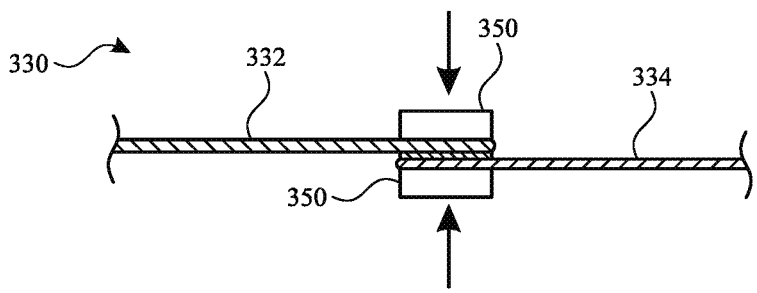
FIG. 24 illustrates a side view of the tensioning element of FIG. 23 in an engaged configuration, according to some embodiments of the present disclosure.

By further example, as shown in FIG. 23, multiple sliding elements 332 and 334 can be free to slide relative to each other in a first configuration. As shown in FIG. 24, the sliding elements 332 and 334 can be mechanically pressed against each other by clamp members 350 to create friction there between and to resist relative sliding and/or other movement. In some embodiments, the clamp members 350 can be operated by a motor, actuator, or other mechanism controllably drive them towards each other. The resulting forces can be sufficient to create friction between the sliding elements 332 and 334. In this condition, the sliding elements 332 and 334 can be constrained in their ability to slide relative to each other, thereby maintaining a particular length of the tensioning element 330.

Figure 25:
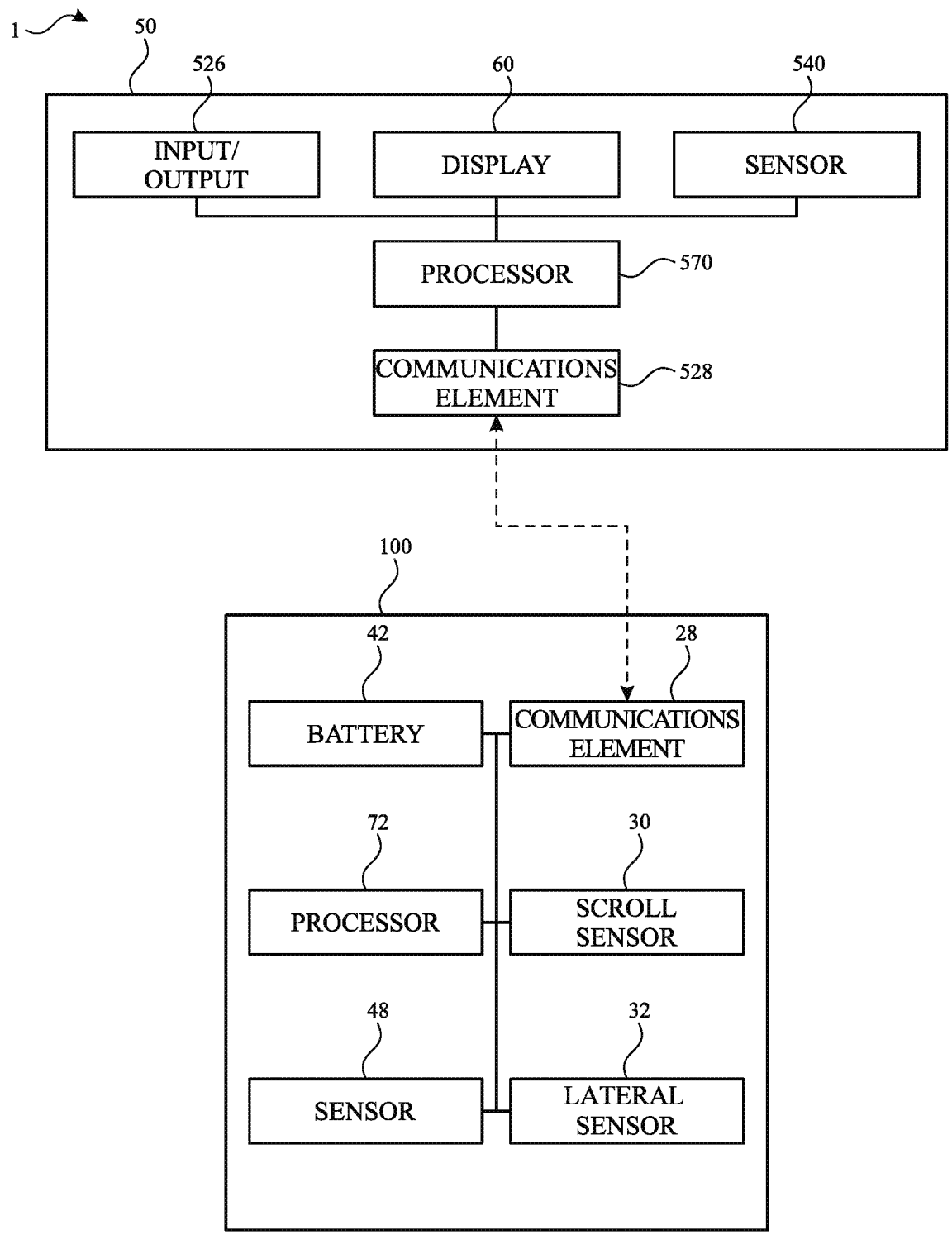
FIG. 25 illustrates a block diagram of a system including an external device and a ring input device, in accordance with some embodiments of the present disclosure.

Referring now to FIG. 25, components of a system can be provided and operatively connected to achieve the performance described herein. FIG. 25 shows a simplified block diagram of an external device 50 (e.g., head-mountable device, computing device, smart phone, wearable audio device, television, etc.) and a ring input device 100, in accordance with one or more embodiments of the disclosure.

As shown in FIG. 25, the external device 50 can include a processor 570 with one or more processing units that include or are configured to access a memory having instructions stored thereon. The instructions or computer programs may be configured to perform one or more of the operations or functions described with respect to the external device 50. The processor 570 can be implemented as any electronic device capable of processing, receiving, or transmitting data or instructions. For example, the processor 570 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the external device 50. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

The external device 50 can further include a display 60 for displaying visual information for a user. The display 60 can provide visual (e.g., image or video) output. The display 60 can be or include an opaque, transparent, and/or translucent display. The display 60 may have a transparent or translucent medium through which light representative of images is directed to a user's eyes. The display 60 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The external device 50 can include an optical subassembly configured to help optically adjust and correctly project the image-based content being displayed by the display 60 for close up viewing. The optical subassembly can include one or more lenses, mirrors, or other optical devices.

The external device 50 can include a sensor 540, such as a camera for capturing a view of an environment external to the external device 50. The camera can include an optical sensor, such as a photodiode or a photodiode array. Additionally or alternatively, the camera can include one or more of various types of optical sensors that are arranged in various configurations for detecting user inputs described herein. The camera may be configured to capture an image of a scene or subject located within a field of view of the camera. The image may be stored in a digital file in accordance with any one of a number of digital formats. In some embodiments, the external device 50 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

Additionally or alternatively, the sensor 540 can include an environmental sensor that detects one or more conditions in an environment of the external device 50. For example, an environmental sensor can include an imaging device, a thermal sensor, a proximity sensor, a motion sensor, a humidity sensor, a chemical sensor, a light sensor, and/or a UV sensor. An environmental sensor can be configured to sense substantially any type of characteristic such as, but not limited to, images, pressure, light, touch, force, temperature, position, motion, and so on. For example, the environmental sensor may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment.

The sensor 540 can provide information regarding a characteristic of the external device 50, such as inertial angles thereof. For example, the sensor 540 can include a six-degrees of freedom IMU that calculates the external device's position, velocity, and/or acceleration based on six degrees of freedom (x, y, z, θx, θy, and θz). The IMU can include one or more of an accelerometer, a gyroscope, and/or a magnetometer. Additionally or alternatively, the external device 50 can detect motion characteristics of the external device 50 with one or more other motion sensors, such as an accelerometer, a gyroscope, a global positioning sensor, a tilt sensor, and so on for detecting movement and acceleration of the external device 50. The IMU can provide data to the processor 570 for processing.

The sensor 540 can include one or more user sensors for tracking features of the user using or wearing the external device 50. For example, a user sensor can perform facial feature detection, facial movement detection, facial recognition, eye tracking, user mood detection, user emotion detection, voice detection, etc. Such eye tracking may be used to determine a location of information to be displayed on the display 60 and/or a portion (e.g., object) of a view to be analyzed by the external device 50. By further example, the user sensor can be a bio-sensor for tracking biometric characteristics, such as health and activity metrics. The user sensor can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

The external device 50 can include an input/output component 526, which can include any suitable component for allowing a user to provide input and/or receive output. The input/output component 526 can include, for example, one or more buttons, crowns, keys, dials, trackpads, microphones, haptic devices, and the like. Additionally or alternatively, the input/output component 526 can include any suitable component for connecting the external device 50 to other devices. Suitable components can include, for example, audio/video jacks, data connectors, or any additional or alternative input/output components. The input/output component 526 can include a microphone that can be operably connected to the processor 570 for detection of sound levels and communication of detections for further processing, as described further herein. The input/output component 526 can include the speakers that can be operably connected to the processor 570 for control of speaker output, including sound levels, as described further herein.

The external device 50 can include a communication element 528 for communicating with one or more servers or other devices using any suitable communications protocol. For example, the communication element 528 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communication element 528 can also include an antenna for transmitting and receiving electromagnetic signals.

FIG. 25 also shows a simplified block diagram of the ring input device 100 in accordance with one or more embodiments of the disclosure.

As shown in FIG. 25, the ring input device 100 can include a processor 72 with one or more processing units that include or are configured to access a memory having instructions stored thereon. The instructions or computer programs may be configured to perform one or more of the operations or functions described with respect to the ring input device 100. The processor 72 can be implemented as any electronic device capable of processing, receiving, or transmitting data or instructions. For example, the processor 72 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the ring input device 100. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

As shown in FIG. 25, the ring input device 100 can include a scroll sensor 30 for detecting relative rotation of components thereof, as described herein. As further shown in FIG. 25, the ring input device 100 can include a lateral sensor 32 for detecting relative lateral movement of components thereof, as described herein. The ring input device 100 can include a battery 42, which can charge and/or power components of the ring input device 100.

The sensor 48 can include one or more user sensors for tracking features of the user using or wearing the ring input device 100. For example, a user sensor can perform facial feature detection, facial movement detection, facial recognition, eye tracking, user mood detection, user emotion detection, voice detection, etc. Such eye tracking may be used to determine a location of information to be displayed on the display 60 and/or a portion (e.g., object) of a view to be analyzed by the ring input device 100. By further example, the user sensor can be a bio-sensor for tracking biometric characteristics, such as health and activity metrics. The user sensor can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

The sensor 48 can provide information regarding a characteristic of the ring input device 100, such as inertial angles thereof. For example, the sensor 48 can include a six-degrees of freedom IMU that calculates the external device's position, velocity, and/or acceleration based on six degrees of freedom (x, y, z, θx, θy, and θz). The IMU can include one or more of an accelerometer, a gyroscope, and/or a magnetometer. Additionally or alternatively, the ring input device 100 can detect motion characteristics of the ring input device 100 with one or more other motion sensors, such as an accelerometer, a gyroscope, a global positioning sensor, a tilt sensor, and so on for detecting movement and acceleration of the ring input device 100. The IMU can provide data to the processor 72 for processing.

The external device 50 can include a communication element 28 for communicating with one or more servers or other devices using any suitable communications protocol. For example, the communication element 28 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communication element 28 can also include an antenna for transmitting and receiving electromagnetic signals.

Accordingly, embodiments of the present disclosure provide a system for facilitating user input for an external device, such as a head-mountable device, which can be operated with a ring input device worn on a finger of a user. Such devices can be operated to provide inputs that are received and acted upon by the external device. The inputs can be provided as rotating, tilting, and/or sliding at least a portion of the ring input device with another finger of the user. The ring input device can provide feedback to the user as confirmation that the inputs are being received. A feedback system can also be operated to limit or otherwise provide a force on the finger and/or another portion of the hand to simulate sensations perceived by the user.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A ring input device to be worn on a finger, the ring input device comprising:
    an inner ring configured to receive the finger and forming inner ring protrusions;
    an outer ring that forms an outer ring protrusion and being configured to rotate about the inner ring such that the outer ring protrusion contacts the inner ring protrusions as the outer ring rotates, the outer ring comprising an encoding pattern comprising light and dark markings;
    an optical sensor directed towards the outer ring and being configured to detect rotation of the outer ring about the inner ring based on a detection of the encoding pattern of the outer ring; and
    a communication element configured to communicate a signal to an external device, the signal comprising an instruction for the external device to perform an operation based on the detected rotation of the outer ring about the inner ring.

2. The ring input device of claim 1, wherein:
    the inner ring protrusions comprise magnets in an alternating polarity arrangement; and
    the ring input device further comprises a magnetometer.

3. The ring input device of claim 1, further comprising an inertial measurement unit sensor configured to detect contact of the outer ring protrusion with the inner ring protrusions as the outer ring rotates about the inner ring.

4. The ring input device of claim 1, wherein:
    the inner ring protrusions are separated by gaps; and
    the optical sensor that is arranged so that, as the outer ring rotates about the inner ring, the inner ring protrusions and gaps alternatingly block and transmit light emitted along a light pathway of the optical sensor.

5. The ring input device of claim 1, wherein:
    the outer ring protrusion is one of multiple outer ring protrusions of the outer ring;
    the outer ring comprises outer ring magnets; and
    the inner ring comprises inner ring magnets, wherein the inner ring magnets and the outer ring magnets form a radial magnetic bearing arranged such that the outer ring is:
        biased to an initial position in which the inner ring protrusions do not contact the outer ring protrusions as the outer ring rotates about the inner ring; and
        configured to be deflected to a deflected position in which the inner ring protrusions contact the outer ring protrusions as the outer ring rotates about the inner ring.

6. A system comprising:
    the ring input device of claim 1; and
    a head-mountable device comprising a display configured to alter a visual output thereof in response to the detection by the optical sensor.

7. A ring input device to be worn on a finger, the ring input device comprising:
    an inner ring configured to receive the finger and forming a housing;
    an outer ring that forms outer ring protrusions and being configured to rotate about the inner ring, wherein the housing of the inner ring extends about a portion of the outer ring, wherein the outer ring protrusions are separated by gaps; and
    an optical sensor comprising a light emitter and a light sensor, the optical sensor being arranged within the housing so that, as the outer ring rotates about the inner ring, the outer ring protrusions and gaps alternatingly block and transmit light emitted from the light emitter towards the light sensor; and
    a communication element configured to communicate a signal to an external device, the signal comprising an instruction for the external device to perform an operation based on a detected rotation of the outer ring about the inner ring.

8. The ring input device of claim 7, wherein:
    the inner ring protrusions comprise magnets in an alternating polarity arrangement; and
    the ring input device further comprises a magnetometer.

9. The ring input device of claim 7, further comprising an inertial measurement unit sensor configured to detect contact of the outer ring protrusion with the inner ring protrusions as the outer ring rotates about the inner ring.

10. The ring input device of claim 7, wherein:
    the outer ring protrusion is one of multiple outer ring protrusions of the outer ring;
    the outer ring comprises outer ring magnets; and
    the inner ring comprises inner ring magnets, wherein the inner ring magnets and the outer ring magnets form a radial magnetic bearing arranged such that the outer ring is:
        biased to an initial position in which the inner ring protrusions do not contact the outer ring protrusions as the outer ring rotates about the inner ring; and
        configured to be deflected to a deflected position in which the inner ring protrusions contact the outer ring protrusions as the outer ring rotates about the inner ring.

11. A system comprising:
    the ring input device of claim 7; and
    a head-mountable device comprising a display configured to alter a visual output thereof in response to a detection by the optical sensor.

12. A ring input device to be worn on a finger, the ring input device comprising:
    an inner ring configured to receive the finger and forming a housing;
    an outer ring that forms outer ring protrusions and being configured to rotate about the inner ring, wherein the housing of the inner ring extends about a portion of the outer ring, the outer ring forming multiple channels; and
    an optical sensor comprising a light emitter and a light sensor, the optical sensor being arranged within the housing so that, as the outer ring rotates about the inner ring, the channels reflect light emitted from the light emitter towards the light sensor; and a communication element configured to communicate a signal to an external device, the signal comprising an instruction for the external device to perform an operation based on a detected rotation of the outer ring about the inner ring.

13. The ring input device of claim 12, wherein:
the inner ring protrusions comprise magnets in an alternating polarity arrangement; and
the ring input device further comprises a magnetometer.

14. The ring input device of claim 12, further comprising an inertial measurement unit sensor configured to detect contact of the outer ring protrusion with the inner ring protrusions as the outer ring rotates about the inner ring.

15. The ring input device of claim 12, wherein:
the inner ring protrusions are separated by gaps; and
the optical sensor that is arranged so that, as the outer ring rotates about the inner ring, the inner ring protrusions and gaps alternatingly block and transmit light emitted along a light pathway of the optical sensor.

16. The ring input device of claim 12, wherein:
the outer ring protrusion is one of multiple outer ring protrusions of the outer ring;
the outer ring comprises outer ring magnets; and
the inner ring comprises inner ring magnets, wherein the inner ring magnets and the outer ring magnets form a radial magnetic bearing arranged such that the outer ring is:
biased to an initial position in which the inner ring protrusions do not contact the outer ring protrusions as the outer ring rotates about the inner ring; and
configured to be deflected to a deflected position in which the inner ring protrusions contact the outer ring protrusions as the outer ring rotates about the inner ring.

17. A system comprising:
the ring input device of claim 12; and
a head-mountable device comprising a display configured to alter a visual output thereof in response to a detection by the optical sensor.

* * * * *